3,080,370
5-CARBAMOYLMETHYLTHIO-6-AMINOURACIL AND DERIVATIVES THEREOF
Elmer F. Schroeder, Chicago, Ill., assignor to G.D. Searle & Co., Chicago, Ill., a corporation of Delaware
No Drawing. Filed July 21, 1961, Ser. No. 125,668
12 Claims. (Cl. 260—256.5)

The present invention is concerned with novel heterocyclic carbamoyl compounds and, more particularly, with 5-carbamoylmethylthio-6-aminouracil and derivatives thereof, which are represented by the formula

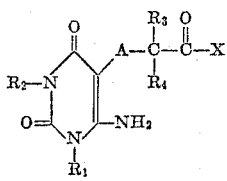

wherein $R_1$ and $R_2$ are members of the class consisting of hydrogen, lower alkyl, lower alkenyl, and hydroxy-(lower alkyl), $R_3$ and $R_4$ are members of the class consisting of hydrogen, —O-(lower alkyl), and 2-chloroethoxy, A can be a thio or sulfonyl group, and X is the residue of ammonia or of a primary or secondary lower alkyl, lower alkenyl, or hydroxy(lower alkyl)amine.

Examples of the lower alkyl radicals represented in the foregoing structural formula are methyl, ethyl, propyl, butyl, pentyl, hexyl, and the branched-chain isomers thereof. The lower alkenyl radicals are typified by vinyl, propenyl, butenyl, pentenyl, hexenyl, and the corresponding branched-chain isomers.

The compounds of this invention are conveniently prepared from the corresponding 3,6,8 - triketopyrimido[5,4-b]1,4-thiazines by reaction with ammonia or with an appropriate amine. A specific example of this process is the reaction of 5-propyl-7-ethyl-3,6,8-triketopyrimido[5,4-b]1,4-thiazine with aqueous methylamine to produce 1 - propyl - 3 - ethyl - 5 - [(N-methylcarbamoyl)methylthio]-6-aminouracil. The reaction is suitably carried out at room temperature over a period of 1–6 days, and the products frequently crystallize directly from the reaction mixture. The required 1,4-thiazine precursors are produced from the corresponding 6-amino-5-carboxymethylmercaptouracils optionally oxygenated at the sulfur atom, as is described in my copending application, Serial No. 112,792, filed May 26, 1961.

The instant compounds are useful as a result of their valuable pharmacological properties. They are, for example, anti-inflammatory agents as is evidenced by their ability to inhibit the local edema formation characteristic of inflammatory states. They are also central nervous system stimulants.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A solution of 2 parts of 5-propyl-7-ethyl-3,6,8-triketopyrimido[5,4-b]1,4-thiazine in 5.4 parts of concentrated ammonium hydroxide is kept at room temperature for about 6 days. The crystals which separate are collected by filtration, washed with water, and dried to yield 1-propyl - 3 - ethyl - 5 - carbamoylmethylthio - 6 - aminouracil. Recrystallization from ethanol or from water affords the pure material, melting at about 204–206°. It is represented by the formula

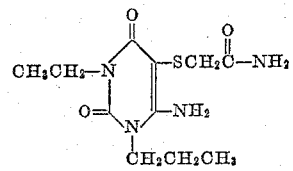

Example 2

A solution of 2 parts of 5-propyl-7-ethyl-3,6,8-triketopyrimido[5,4-b]1,4-thiazine in 5.4 parts of 25% aqueous methylamine is stored at room temperature for about 6 days, then is filtered to isolate the crystalline product. The crystals are washed on the filter with water, then dried to afford 1-propyl-3-ethyl-5-[(N-methylcarbamoyl)methylthio]-6-aminouracil, which melts at about 185–187°, and is represented by the formula

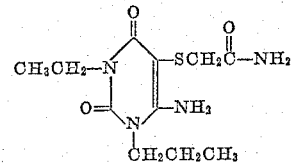

Example 3

A mixture of 2 parts of 5-propyl-7-ethyl-3,6,8-triketopyrimido[5,4-b]1,4-thiazine, 6 parts of water, and 1.44 parts of propylamine is stored at room temperature for about 3 days, then is diluted with about 5 parts of water. The resulting crystals are collected by filtration and washed with water on the filter to afford the monohydrate of 1-propyl-3-ethyl-5-[(N-propylcarbamoyl)methylthio]-6-aminouracil, which melts at about 102–103° with effervescence. The monohydrate is dissolved in 20 parts of ethyl acetate, and this solution is heated at reflux for about 10 minutes, then diluted with 15 parts of hexane. The mixture is cooled and the resulting crystals are collected by filtration, then dried to produce anhydrous 1-propyl - 3 - ethyl - 5 - [(N - propylcarbamoyl)methylthio]-6-aminouracil, melting at about 158–159°. It is represented by the formula

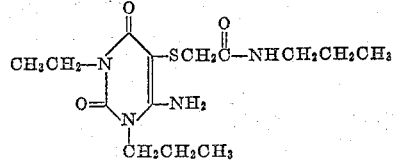

Example 4

A solution of 4.4 parts of 2-ethoxy-5-propyl-7-ethyl-3,6,8-triketopyrimido[5,4-b]1,4-thiazine in 13.5 parts of concentrated ammonium hydroxide is stored at room temperature for about 3 days. The crystalline product is separated by filtration and washed with water on the filter, then dried. This crude product is recrystallized from ethanol to yield pure 1-propyl-3-ethyl-5-[carbamoyl(ethoxy)methylthio]-6-aminouracil, which melts at about 222–223° with decomposition, and is characterized by the formula

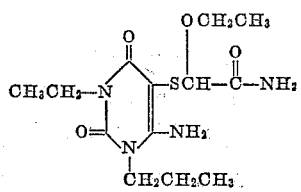

*Example 5*

A solution of 4.4 parts of 2-ethoxy-5-propyl-7-ethyl-3,6,8-triketopyrimido[5,4-b]1,4-thiazine in 13.5 parts of 25% aqueous methylamine is stored at room temperature for about 66 hours. The crystals which form are collected by filtration, washed with water, and dried to yield the monohydrate of 1-propyl-3-ethyl-5-[N-methylcarbamoyl(ethoxy)methylthio]-6-aminouracil, which melts at about 107–111° with effervescence. Heating this monohydrate at about 80° for about 24 hours, followed by recrystallizing from ethyl acetate-hexane affords the anhydrous product, M.P. about 164–166°, which is represented by the formula

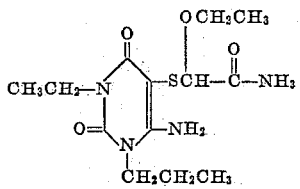

*Example 6*

A solution of one part of 5-propyl-7-ethyl-3,6,8-triketopyrimido[5,4-b]1,4-thiazine 1,1-dioxide in 2.7 parts of concentrated ammonium hydroxide is kept at room temperature for about 24 hours, and the resulting crystals are collected by filtration, washed with water, and dried to yield the crude product. Recrystallization from ethanol affords pure 1-propyl-3-ethyl-5-carbamoylmethylsulfonyl-6-aminouracil, melting at about 236–238°, and displaying the formula

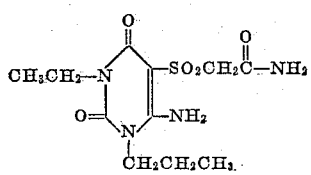

*Example 7*

A solution of one part of 5-propyl-7-ethyl-3,6,8-triketopyrimido[5,4-b]1,4-thiazine 1,1-dioxide in 2.7 parts of 25% aqueous methylamine is stored at room temperature for about 42 hours. The crystals which form are collected by filtration, washed on the filter with water, and dried to yield 1-propyl-3-ethyl-5-[(N-methylcarbamoyl)methylsulfonyl]-6-aminouracil, which is characterized by a melting point at about 197–199°, and is represented by the formula

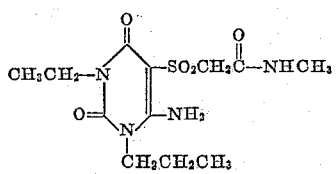

*Example 8*

A solution of 3.8 parts of 2,2-diethoxy-5-propyl-7-ethyl-3,6,8-triketopyrimido[5,4-b]1,4-thiazine in 18 parts of concentrated ammonium hydroxide is stored at room temperature, with occasional shaking, for about 13 days. The voluminous precipitate, which separates initially, redissolves upon further standing. At the end of the reaction period, the granular precipitate of the desired product is collected by filtration, washed with water, and recrystallized from ethanol to afford colorless crystals of 1-propyl-3-ethyl-5-[carbamoyl(diethoxy)methylthio]-6-aminouracil, melting at about 188–189° with effervescence. It is characterized by the formula

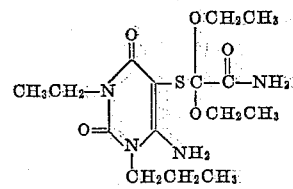

*Example 9*

A mixture of 7 parts of 3,6,8-triketopyrimido[5,4-b]1,4-thiazine in 135 parts of concentrated ammonium hydroxide is stored at room temperature for about 4 days. The reaction mixture is then stripped of excess ammonia by heating on the steam bath. Acidification of the aqueous mixture with acetic acid results in precipitation of a crystalline product. It is collected by filtration, then recrystallized from water to afford colorless crystals of 5-carbamoylmethylthio-6-aminouracil, which does not melt up to 320°, but displays extensive charring above 260°. This substance is represented by the formula

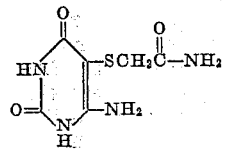

*Example 10*

A solution of 3 parts of 2-(2-chloroethoxy)-5-propyl-7-ethyl-3,6,8-triketopyrimido[5,4-b]1,4-thiazine in 18 parts of concentrated ammonium hydroxide is kept at room temperature for about 24 hours. The crystalline product which separates from the reaction mixture is collected by filtration, washed with cold water, then recrystallized from water to produce colorless crystals of 1-propyl-3-ethyl-5-[carbamoyl(2-chloroethoxy)methylthio]-6-aminouracil, which melts at about 175–177°, and is represented by the formula

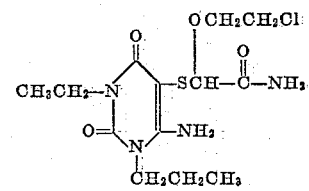

*Example 11*

A solution of 2.27 parts of 5,7-dimethyl-3,6,8-triketopyrimido[5,4-b]1,4-thiazine in 10 parts of water containing 1.52 parts of allylamine is allowed to stand at room temperature for about 4 days, during which time the crystalline product separates from the reaction mixture. This product is collected by filtration, washed with cold water, then recrystallized from water to afford colorless crystals of 1,3-dimethyl-5-[(N-allylcarbamoyl)methylthio]-6-aminouracil, M.P. about 164–166°. This compound is illustrated by the formula

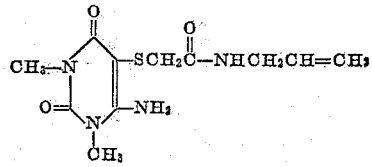

Example 12

A solution of 2.27 parts of 5,7-dimethyl-3,6,8-triketopyrimido[5,4-b]1,4-thiazine in 10 parts of water containing 2.04 parts of 2-hydroxyethylamine is kept at room temperature for about 4 days. The crystalline product which forms is collected by filtration, washed on the filter with cold ethanol, then recrystallized from ethanol. The resulting colorless crystals of 1,3-dimethyl-5-[(N-2-hydroxyethylcarbamoyl)methylthio]-6-aminouracil melt at about 182–184°. This substance is represented by the formula

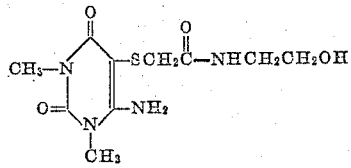

Example 13

A solution of one part of 5-(2-hydroxyethyl)-7-ethyl-3,6,8-triketopyrimido[5,4-b]1,4-thiazine in 2.7 parts of concentrated ammonium hydroxide is stored at room temperature for about 4 days, and the resulting crystalline precipitate is collected by filtration, then washed with water on the filter, and finally recrystallized from water. The colorless crystals of 1-(2-hydroxyethyl)-3-ethyl-5-carbamoylmethylthio-6-aminouracil thus obtained melt at about 203–205°. This compound is characterized by the formula

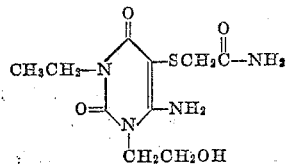

Example 14

A solution of one part of 5-allyl-7-ethyl-3,6,8-triketopyrimido[5,4-b]1,4-thiazine in 3 parts of water containing 2.7 parts of concentrated ammonium hydroxide is stored at room temperature for about 24 hours. The crystals which separate during this period are collected by filtration, washed with water, and recrystallized from water to afford colorless crystals of 1-allyl-3-ethyl-5-carbamoylmethylthio-6-aminouracil, which displays a melting point at about 197–198°, and is represented by the formula

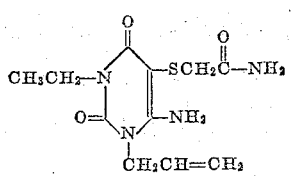

Example 15

A solution of one part of 5,7-dimethyl-3,6,8-triketopyrimido[5,4-b]1,4-thiazine in 4.5 parts of 25% aqueous dimethylamine is kept at room temperature for about 3 days, then is evaporated to dryness by heating on the steam bath. The resulting residual solid is recrystallized from ethanol to produce colorless crystals of 1,3-dimethyl-5 - [(N,N - dimethylcarbamoyl)methylthio] - 6 - aminouracil, which melts at about 200–202°, and is illustrated by the formula

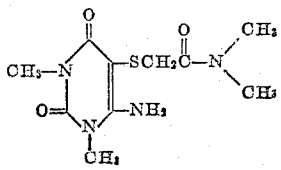

Example 16

The substitution of 7.3 parts of 25% aqueous diethylamine in the procedure of Example 15 results in 1,3-dimethyl - 5 - [(N,N - diethylcarbamoyl)methylthio] - 6 - aminouracil of the formula

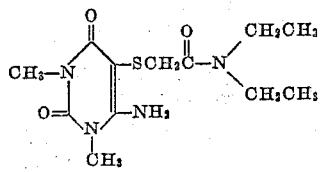

Example 17

By substituting 2.51 parts of 3-hydroxypropylamine and otherwise proceeding according to the processes of Example 12, 1,3-dimethyl-5-[(N-3-hydroxypropylcarbamoyl)methylthio]-6-aminouracil is obtained. This compound is illustrated by the formula

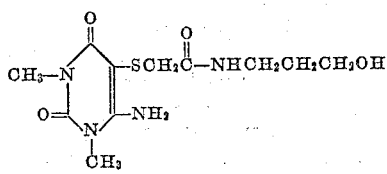

Example 18

The substitution of 1.89 parts of crotylamine in the process of Example 11 results in 1,3-dimethyl-5-[(N-crotylcarbamoyl)methylthio]-6-aminouracil of the formula

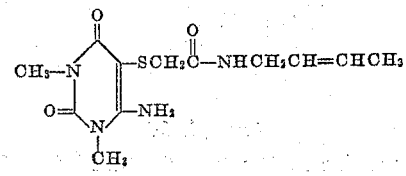

Example 19

By substituting 3.45 parts of 2,2-dimethoxy-5-propyl-7-ethyl-3,6,8 - triketopyrimido[5,4 - b]1,4 - thiazine in the procedure of Example 8, 1-propyl-3-ethyl-5-[carbamoyl-(dimethoxy)methylthio]-6-aminouracil is obtained. It is represented by the formula

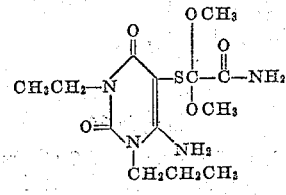

Example 20

By substituting 4.2 parts of 2 - methoxy - 5 - propyl-7-ethy-3,6,8-triketopyrimidol[5,4-b]1,4-thiazine and otherwise proceeding according to the processes of Example 5, 1-propyl-3-ethyl-5-[N-methylcarbamoyl(methoxy)methylthio]-6-aminouracil is obtained. It is characterized by the formula

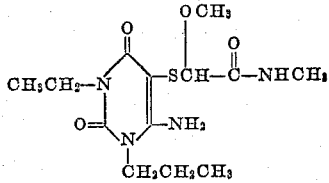

Example 21

The substitution of one part of 5-(3-hydroxypropyl)-7-methyl-3,6,8-triketopyrimido[5,4 - b]1,4 - thiazine in the procedure of Example 13 results in 1-(3-hydroxypropyl)-

3-methyl-5-carbamoylmethylthio-6-aminouracil, which is characterized by the formula

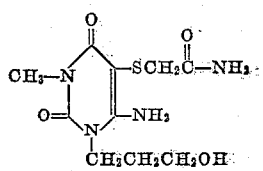

Example 22

By substituting one part of 5-methallyl-7-methyl-3,6,8-triketopyrimido[5,4-b]1,4-thiazine and otherwise proceeding according to the processes of Example 14, 1-methallyl-3-methyl-5-carbamoylmethylthio-6-aminouracil is obtained. This compound is illustrated by the formula

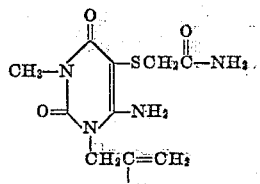

Example 23

The substitution of 1.65 parts of 5,7-dimethyl-3,6,8-triketopyrimido[5,4-b]1,4-thiazine in the procedure of Example 1 results in 1,3-dimethyl-5-carbamoylmethylthio-6-aminouracil of the formula

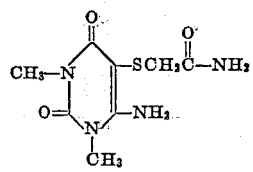

Example 24

By substituting 1.65 parts of 5,7-dimethyl-3,6,8-triketopyrimido[5,4-b]1,4-thiazine and otherwise proceeding acording to the processes of Example 2, 1,3-dimethyl-5-[(N-methylcarbamoyl)methylthio]-6-aminouracil is obtained. This substance is represented by the formula

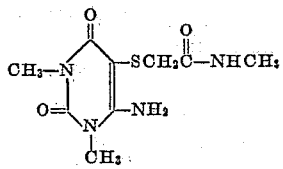

Example 25

The substitution of 3.7 parts of 2-ethoxy-5,7-dimethyl-3,6,8-triketopyrimido[5,4-b]1,4-thiazine in the procedure of Example 4 results in 1,3-dimethyl-5-[carbamoyl(ethoxy)methylthio]-6-aminouracil of the formula

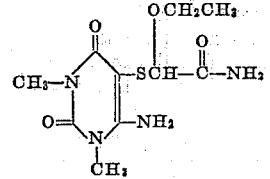

What is claimed is:
1. A compound of the formula

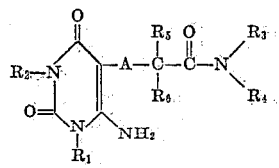

wherein $R_1$, $R_2$, $R_3$, and $R_4$ are members of the class consisting of hydrogen and radicals selected from the group consisting of lower alkyl, lower alkenyl, and hydroxy (lower alkyl), $R_5$ and $R_6$ are selected from the group consisting of hydrogen, —O-(lower alkyl), and 2-chloroethoxy, and A is selected from the group of bivalent radicals consisting of thio and sulfonyl.

2. A compound of the formula

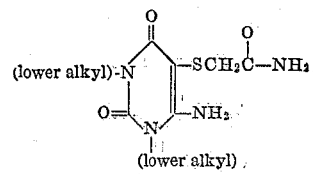

3. A compound of the formula

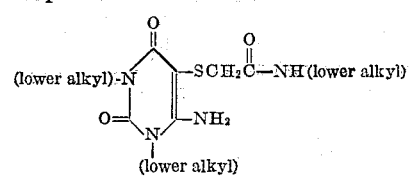

4. A compound of the formula

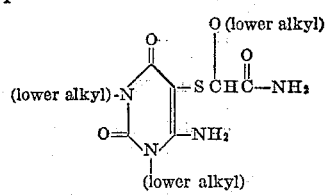

5. 1-propyl-3-ethyl-5-carbamoylmethylthio-6-aminouracil.
6. 1-propyl-3-ethyl-5[(N-methylcarbamoyl)methylthio]-6-aminouracil.
7. 1-propyl-3-ethyl-5-[(N-propylcarbamoyl)methylthio]-6-aminouracil.
8. 1-propyl-3-ethyl-5-[carbamoyl(ethoxy)methylthio]-6-aminouracil.
9. 1-propyl-3-ethyl-5-carbamoylmethylsulfonyl-6-aminouracil.
10. 1-propyl-3-ethyl-5-[N-methylcarbamoyl(ethoxy)methylthio]-6-aminouracil.
11. 1-propyl-3-ethyl-5-[(N-methylcarbamoyl)methylsulfonyl]-6-aminouracil.
12. 1-propyl-3-ethyl-5-[carbamoyl(diethoxy)methylthio]-6-aminouracil.

References Cited in the file of this patent
UNITED STATES PATENTS
2,958,692     Schroeder _____ Nov. 1, 1960